US005154398A

United States Patent [19]

Mayfield

[11] Patent Number: 5,154,398

[45] Date of Patent: Oct. 13, 1992

[54] SPRING STRETCHER

[76] Inventor: Lenval M. Mayfield, 202 Sinclair Rd., San Antonio, Tex. 78222

[21] Appl. No.: 791,320

[22] Filed: Nov. 14, 1991

[51] Int. Cl.[5] ........ B23P 19/04

[52] U.S. Cl. ........ 254/10.5; 29/227; 269/6

[58] Field of Search ........ 29/225, 227, 239, 237; 254/10.5; 269/166-170, 6, 203, 204, 88; 81/487, 126

[56] References Cited

U.S. PATENT DOCUMENTS

| | | | |
|---|---|---|---|
| 1,951,953 | 3/1934 | Tollonitsch . | |
| 2,779,087 | 1/1957 | Shanan . | |
| 2,883,742 | 4/1959 | Prath . | |
| 3,747,895 | 7/1973 | Martin . | |
| 4,253,648 | 3/1981 | Meeks | 269/6 |
| 4,266,729 | 1/1983 | Strubing | 254/10.5 |
| 5,009,134 | 4/1991 | Sorensen et al. | 269/166 |

*Primary Examiner*—Robert C. Watson
*Attorney, Agent, or Firm*—Richard C. Litman

[57] ABSTRACT

A spring stretcher for stretching furniture springs, such as no sag springs, commonly found in sofas, lounge chairs and the like. This spring stretcher stretches a replacement spring in an obstructed environment, thus will stretch a replacement furniture spring without having to remove the upholstery from the piece of furniture. The spring stretcher includes a ratchet mechanism having a barrel threadably attached to one end of the ratchet mechanism and a telescoping rod is inserted through the opposite end of the ratchet mechanism which passes through the ratchet mechanism and is fed into the barrel. A hook is fastened to the end of the barrel opposite its threadably attached end and another hook is fastened to the exposed end of the telescoping rod. The hooks rotatably fastened to the device further enhance its application in a confined area. The spring is secured at each end to one of each of the hooks. As the ratchet mechanism actuates the telescoping rod, the two hooks diverge to stretch the spring. Once the spring has reached a desired length, a quick release is provided to relieve the tension on the spring.

7 Claims, 1 Drawing Sheet

SPRING STRETCHER

BACKGROUND OF THE INVENTION

1. Field of the Invention

The present invention relates to a spring stretcher for use in stretching furniture springs.

2. Description of Prior Art

Items of furniture, such as sofa and lounge chairs, include as a support a zig zag spring which is commonly referred to as a "no sag" spring. These springs are pulled taut and fastened to the furniture frame prior to the padding and the upholstery being applied. Over a period of time, through use a spring may encounter an excess amount of wear and break. When this occurs, a repairman will generally have to remove the upholstery in order to replace the spring or will have to struggle with stretching and refastening the spring without removing the upholstery. A spring stretcher which could be applied to the spring that would stretch the spring substantially back to its original length without having to remove all if any of the upholstery would make the job of the furniture repairman a lot simpler and in turn possibly pass a savings on to the consumer.

There are many devices known for stretching springs. Most of these are used in the application of installing or removing the spring being stretched. However, no device provides a simple ratchet mechanism capable of being operated with relative ease in a restricted environment and having a quick release feature whereby the tension applied to stretch the spring would be relieved.

U.S. Pat. No. 1,951,953 issued Mar. 20, 1934 to John Tollonitsch discloses a ratchet device for expanding coil springs used in conjunction with the installation and removal of the spring.

U.S. Pat. No. 2,779,087 issued Jan. 29, 1957 to Alva V. Shanan discloses a device for stretching tension springs comprising a tubular barrel and a telescoping rod actuated by a hand crank for removing and installing conventional automobile hood springs.

U.S. Pat. No. 2,883,742 issued Apr. 28, 1959 to Frank Prath discloses a spring stretcher comprising telescoping sections to facilitate the stretching of tension springs in preparation of spring installation.

U.S. Pat. No. 3,747,895 issued Jul. 24, 1973 to Marcur Martin discloses a spring extender comprising a pair of telescoping tubes used primarily to remove and install counterbalance springs.

None of the above inventions and patents, taken either singly or in combination, is seen to describe the instant invention as claimed.

SUMMARY OF THE INVENTION

The present invention relates to a spring stretcher to facilitate the stretching of furniture springs. The spring stretcher is comprised of a barrel, a rod, and a ratchet mechanism. The barrel has a hook secured to one end to accommodate the fastening of one end of a spring. The other end of the barrel is fixed to the ratchet mechanism in such a manner as to leave its open end exposed to permit the insertion of the rod. The rod has a hook on one end to permit the fastening of the opposite end of the same spring. The end of the rod opposite the hook passes through the ratchet mechanism and is inserted into the barrel. With the rod inserted into the barrel and the spring secured to each hook, tension is applied by actuating the rod with the ratchet mechanism. As the rod is actuated, the distance between the hooks is increased. When the spring is stretched to the desired length, the tension imposed by the actuating rod is released by activating a release trigger.

Accordingly, one object of the present invention is to provide a spring stretcher having a simple design and being durably constructed.

Another object of the present invention is to provide a spring stretcher having a force applied in a straight line, thus having greater application in a restrictive area.

Another object of the present invention is to provide a spring stretcher which includes an easy to operate ratchet mechanism which actuates a tension rod and release trigger which releases the tension imposed by the tension rod, even in close quarters.

A further object of the present invention is to provide a spring stretcher which includes rotatable hooks to accommodate springs of various configurations, and to reach springs which are heavily obstructed.

These and other objects of the present invention will become readily apparent upon further review of the following specification and drawings.

BRIEF DESCRIPTION OF THE DRAWINGS

Similar reference characters denote corresponding features consistently throughout the attachable drawings.

DETAILED DESCRIPTION OF THE PREFERRED EMBODIMENT

Figures 1, 2:
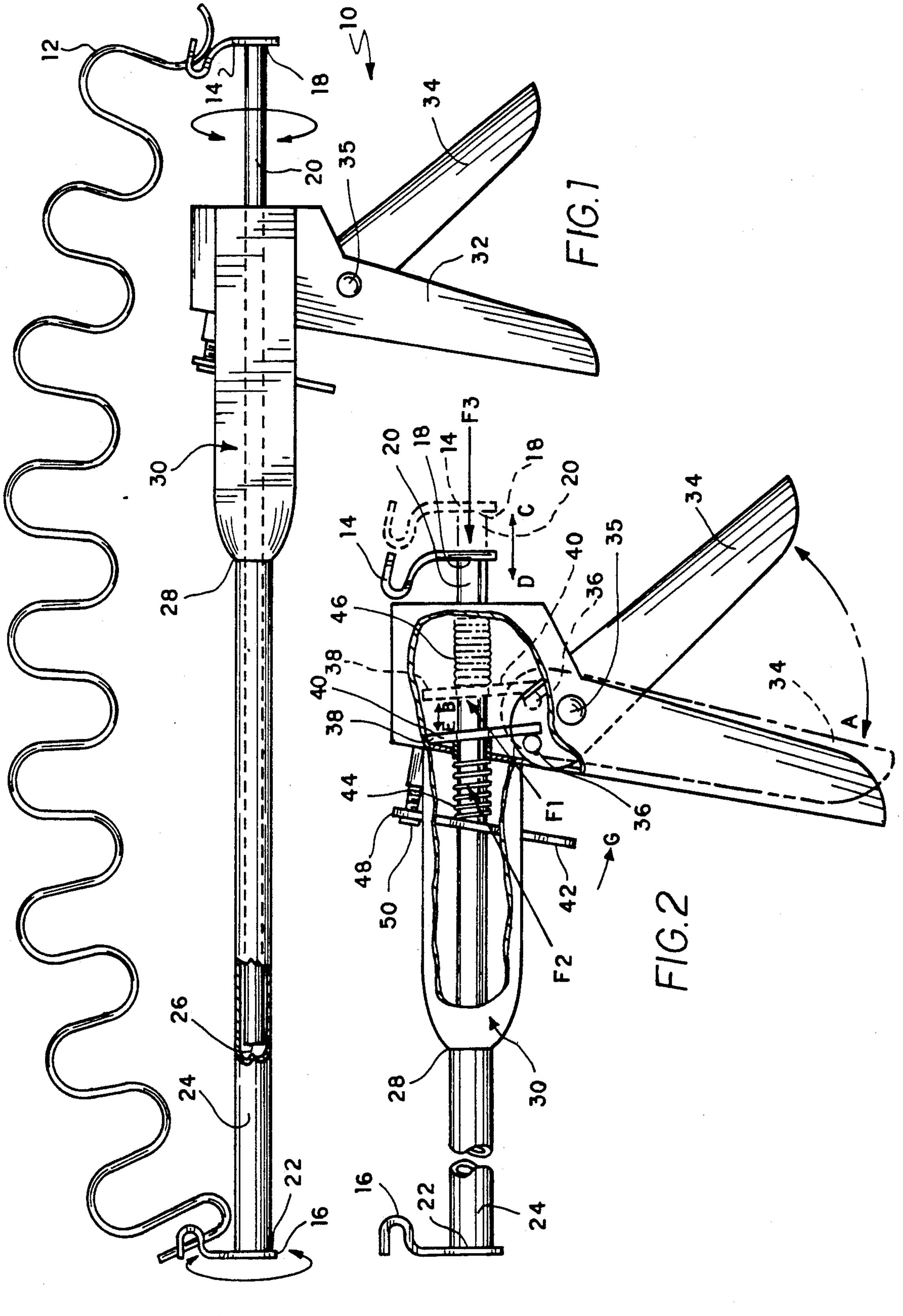
FIG. 1 is a side elevational view of the present invention in use showing the rod exposed in the barrel.
FIG. 2 is a partially broken view of the present invention showing the working relationship between the parts included in the ratchet mechanism.

The present invention, as shown in FIG. 1, is a spring stretcher 10 with a spring 12 attached to a first hook 14 and a second hook 16. The first hook 14 is secured to a first end 18 of a rod 20. The second hook 16 is secured to a second end 22 of a barrel 24 which is threadably attached to a ratchet mechanism 30. The second end 26 of the rod 20 is inserted through the ratchet mechanism 30 into the first end 28 of the barrel 24.

FIGS. 1 and 2 show the relationship of the working parts included in the ratchet mechanism 30. Included is a stationary handle 32 and a pivotal handle 34 which is secured by a rivet 35 and pivots on a pivot point defined by the rivet 35. A pin 36 is located in the top portion of the pivotal handle 34 which makes contact with a first plate 38. The first plate 38 includes a bore 40 having a loose fit configuration with the outside surface of the rod 20 which is inserted therein. As the pivotal handle 34 is ratcheted in the direction A, the first plate 38 moves in the direction B applying a tension or a force F1 on the rod 20 moving the rod 20 in the direction C. A second plate 42, which is biased by a second spring 44, provides a tension or a force F2 which prevents the rod 20 from retracting back in the direction D. After the pivotal handle 34 has moved to an extreme point in the direction A, the operator relieves the pressure on the pivotal handle 34 and a first spring 46 pushes against the first plate 38 moving the first plate 38 back in the direction E. With each ratchet motion of the pivotal handle 34, the rod 20 moves some increment in the direction C. The force F2 imposed on the rod 20 by the second plate 42 is relieved by moving the second plate 42 in the direction G. The second plate 42 is fastened at a pivot point 48 by a stud 50 threadably attached to the ratchet mechanism 30. The second plate 42 is biased by the second spring 44 to maintain the force F2 on the rod 20. With the force F2 released, the rod 20 is retracted in the direction D partially by the furniture spring 12 and is completely retractable by exerting a force F3 of the rod 20. Moreover, with the force F2 released, the rod 20 is adjustable to the initial length of the spring 12 when installing the spring 12 on the spring stretcher 10 prior to stretching the spring 12. In addition, the hooks 14, 16 are rotatable to accommodate many spring 12 configurations.

It is to be understood that the present invention is not limited to the sole embodiment described above, but encompasses any and all embodiments within the scope of the following claims.

I claim:

1. A spring stretching device comprising:

a telescoping means for mounting a spring thereon; said telescoping means comprising a rod slidably insertable in a barrel, said telescopic means further comprising a first · and second rotatable hook means;

a ratchet mechanism for actuating said telescoping means, said rod being insertable into and through and being displaced by said ratchet mechanism and said first and second hook means being rotatable relative to said ratchet mechanism;

a release trigger to retain said telescoping means in an actuated position, and whereby the spring is releasably mounted on said ratchet mechanism via said first and second rotatable hooks and said telescoping means having the a spring mounted thereon can be stretched to a desired length, and once the spring is stretched to the desired length, said release trigger may be pulled to relieve the force applied to said rod, thus enabling the spring to be removed.

2. A spring stretching device comprising:

a telescoping means for mounting a spring thereon, said telescoping means including a pair of hook means whereby the spring may be releasably mountable thereon;

a ratchet mechanism for actuating said telescoping means, said hook means being rotatable relative to the ratchet mechanism, whereby said telescoping means with a spring mounted thereon may be stretched to a desired length; and a release trigger to retain said telescoping means in an actuated position whereby once the spring has been stretched to the desired length, the release trigger may be pulled releasing the force applied to said telescopic means and thus, enabling the spring to be removed.

3. The spring stretcher according to claim 2, wherein said ratchet mechanism includes a first spring biased plate having an opening through which said telescopic means passes, said pivotal handle means includes a pin means engagable with said first plate, and said releasable means includes a second spring biased plate having a hole therein through which said telescopic means passes, whereby actuation of said handle engages said first plate with said telescopic means to move said telescopic means in a first direction and said releasable means engages said telescopic means to maintain said· telescopic means in a moved position in said first direction.

4. The spring stretcher according to claim 1, wherein said ratchet mechanism includes a first spring biased plate having an opening through which said rod passes, said pivotal handle means includes a pin means engagable with said first plate, and said releasable means includes a second spring biased plate having a hole therein through which said rod passes, whereby actuation of said handle engages said first plate with said rod to move said rod in a first direction and said releasable means engages said rod to maintain said rod in a moved position in said first direction.

5. The spring stretcher according to claim 3, wherein said releasable means when manually actuated releases said rod to enable said rod to move in a second direction opposite to said first direction.

6. The spring stretcher according to claim 4, wherein said releasable means when manually actuated releases said rod to enable said rod to move in a second direction opposite to said first direction.

7. A spring stretching device for stretching furniture springs, said spring stretcher comprising:

a ratchet mechanism including a stationary handle and a pivotal handle pivotally fastened to said stationary handle;

a barrel having a hollow interior, a first end, and a second end, said first end of said barrel having attached thereto a rotatable hook to releasably attach a first end of the spring thereon, said second end of said barrel providing an access to said hollow interior of said barrel, said second end of said barrel further being threadably attached to said ratchet mechanism such that said access to said hollow interior of said barrel is exposed interiorly of said ratchet mechanism;

a solid rod including a first end, a second end, and an outside surface, said first end of said solid rod having attached thereto a rotatable hook to releasably attach a second end of the spring thereon, said outside surface having a loose fit configuration with said hollow interior of said barrel, said solid rod is insertable into and through said ratchet mechanism and said access and further into said hollow interior of said barrel; and a release trigger to relieve a force which drives said rod; and whereby the first and second ends of the spring are releasably attached respectively to said rotatable hooks, a leverage is exerted by said ratchet mechanism through an actuation of said pivotal handle which applies a force to drive said rod and separate said rotatable hooks until the spring is stretched to a desired length, once the spring is stretched to the desired length, simply pull the release trigger to relieve the force applied to said rod, thus allowing said rod to contract back into said barrel and enabling the to be removed from said spring stretcher.

* * * * *